United States Patent
Hsu et al.

(10) Patent No.: US 9,870,031 B2
(45) Date of Patent: Jan. 16, 2018

(54) HINGE DEVICE APPLICABLE TO SOFT DISPLAY SCREEN

(71) Applicant: FIRST DOME CORPORATION, New Taipei (TW)

(72) Inventors: An Szu Hsu, New Taipei (TW); Yang Zhong Wu, Shenzhen (CN)

(73) Assignee: First Dome Corporation, New Taipei (TW)

( * ) Notice: Subject to any disclaimer, the term of this patent is extended or adjusted under 35 U.S.C. 154(b) by 190 days.

(21) Appl. No.: 14/886,245

(22) Filed: Oct. 19, 2015

(65) Prior Publication Data

US 2016/0370829 A1   Dec. 22, 2016

(30) Foreign Application Priority Data

Jun. 17, 2015   (TW) .............................. 104209714 U

(51) Int. Cl.
*G06F 1/16*   (2006.01)

(52) U.S. Cl.
CPC .......... *G06F 1/1681* (2013.01); *G06F 1/1652* (2013.01); *Y10T 16/5474* (2015.01)

(58) Field of Classification Search
CPC .... G06F 1/1681; G06F 1/1652; Y10T 16/547; Y10T 16/5474; Y10T 16/5475; Y10T 16/5476; E05D 3/06; E05D 7/00; E05Y 2900/606; F16M 11/10; H04M 1/0216
USPC .............. 16/366, 368, 369, 370; 361/679.27, 361/679.06; 455/575.3; 379/433.13; 248/922
See application file for complete search history.

(56) References Cited

U.S. PATENT DOCUMENTS

| | | | | |
|---|---|---|---|---|
| 6,223,393 B1* | 5/2001 | Knopf | .................. | G06F 1/1681 16/366 |
| 8,720,011 B1* | 5/2014 | Hsu | ........................ | E05D 3/122 16/354 |
| 8,971,032 B2* | 3/2015 | Griffin | .................. | G06F 1/1616 345/156 |
| 9,506,279 B2* | 11/2016 | Kauhaniemi | ......... | G06F 1/1652 |
| 9,562,380 B2* | 2/2017 | Song | ....................... | E05D 1/00 |
| 9,606,583 B2* | 3/2017 | Ahn | ...................... | G06F 1/1681 |
| 2014/0123436 A1* | 5/2014 | Griffin | ................ | H04M 1/0216 16/221 |
| 2015/0277506 A1* | 10/2015 | Cheah | .................. | G06F 1/1681 361/679.27 |
| 2016/0048174 A1* | 2/2016 | Hsu | ...................... | G06F 1/1681 16/342 |

(Continued)

Primary Examiner — William Miller
(74) Attorney, Agent, or Firm — Rosenberg, Klein & Lee

(57) ABSTRACT

A hinge device applicable to soft display screen ensures that the total amount of motion is uniformly distributed to every motional shaft. The hinge device includes multiple joint units and motional shafts. Each joint unit has a shaft fixing section and a shaft guide section assembled with the motional shafts. Each joint unit has a top portion, a first side and a second side. A rotary shaft is formed on the first side along the top portion. A socket is formed on the second side along the top portion. A (soft) display screen is disposed on the top portions of the joint units. The shaft guide section is defined with a first position and a second position. When a user opens/closes the display screen, the rotary shafts serve as rotational fulcrums and the motional shafts are rotatably movable between the first and second positions of the shaft guide section.

40 Claims, 6 Drawing Sheets

(56) References Cited

U.S. PATENT DOCUMENTS

| | | | |
|---|---|---|---|
| 2016/0139634 A1* | 5/2016 | Cho | G06F 1/1652 |
| | | | 361/679.27 |
| 2016/0147267 A1* | 5/2016 | Campbell | G06F 1/1681 |
| | | | 361/679.27 |
| 2016/0202736 A1* | 7/2016 | Huang | G06F 1/1681 |
| | | | 16/369 |
| 2016/0370828 A1* | 12/2016 | Hsu | G06F 1/1652 |
| 2017/0060188 A1* | 3/2017 | Han | G06F 1/1652 |
| 2017/0061836 A1* | 3/2017 | Kim | G09F 9/301 |

* cited by examiner

HINGE DEVICE APPLICABLE TO SOFT DISPLAY SCREEN

BACKGROUND OF THE INVENTION

1. Field of the Invention

The present invention relates generally to a hinge device applicable to soft display screen, and more particularly to a hinge device assembled with an electronic apparatus. The hinge device includes an assembly of multiple joint units formed with rotary shafts and multiple motional shafts for uniformly loading the total amount of motion of the electronic apparatus.

2. Description of the Related Art

There are various electronic apparatuses provided with covers or display screens, such as mobile phones, notebooks, PDA, digital image capturing devices and electronic books. The covers, display screens or viewers are pivotally mounted on the electronic apparatuses via pivot pins or rotary shafts, whereby the covers or display screens can be freely rotated and opened/closed under external force.

In order to operate the display module (such as the screen) and/or the apparatus body module of the electronic apparatus in more operation modes and application ranges, a conventional dual-shaft mechanism mounted between the display module and the apparatus body module has been developed to rotate the display module and/or the apparatus body module by different angles in accordance with different operation modes. For example, U.S. Pat. No. 7,512,426 B2 discloses a mobile communications device with synchronizing hinge.

With respect to the operation, motion and structural design of these pivot pins or hinge devices, the conventional pivot pin device cannot be mounted on a flexible soft display screen or display module in adaptation to the flexion and rotation of the soft screen. This is because:

1. In the case that the conventional pivot pin device or rotary shaft is applied to a flexible soft display screen, the rotary shaft will be relatively positioned on outer face (or outer end face) of the display screen, while the display screen is relatively positioned on the inner (end) face of the rotary shaft. There is a certain distance between the display screen and the axis of the rotary shaft. Therefore, when the display screen is flexed with the axis of the rotary shaft positioned on relative outer end serving as the rotational fulcrum, the display screen on the inner face of the rotary shaft will be squeezed and crimped. This is not what we expect.
2. When the existent rotary shaft or pivot pin device is applied to a flexible soft display screen, the soft display screen cannot be immediately truly located after flexed or opened/closed.
3. When the hinge device is applied to and connected with the soft display screen, it must be ensured that the soft display screen is not pressed and folded or damaged due to too large flexion angle or improper operation of a user. Therefore, the hinge device should keep every part of the soft display screen as uniformly forced as possible.

The conventional rotary shaft and the relevant connection components thereof have some shortcomings in use and structural design that need to be overcome. It is therefore tried by the applicant to provide a hinge device applicable to soft display module to change the use form, widen the application range and facilitate the operation of the conventional rotary shaft and thus eliminate the shortcomings existing in the conventional rotary shaft. Especially, the hinge device is applicable to an electronic apparatus with soft display screen or display module in condition of simple structural design and simple operation of the hinge device, rotary shaft or the relevant connection components to solve the problems of the conventional rotary shaft (that when the display screen is flexed or rotated around the rotary shaft, the display screen will be squeezed and crimped and the soft display screen cannot be truly located). Also, the hinge device can ensure that the soft display screen is not pressed and folded or damaged due to too large flexion angle or improper operation of a user and keep every part of the soft display screen as uniformly forced as possible. In addition, a frictional torque system and/or torque mechanism is further provided to enhance the locating or fixing effect of the hinge device in operation. Moreover, according to the specification, the number or torque of the hinge device and/or torque mechanism can be easily changed or adjusted to meet the pattern design requirement of lightweight and slim configuration of electronic apparatus.

SUMMARY OF THE INVENTION

It is therefore a primary object of the present invention to provide a hinge device applicable to soft display screen, which ensures that the total amount of motion is uniformly distributed to every motional shaft. The hinge device includes an assembly of multiple joint units with rotary shafts and motional shafts. Each joint unit has a shaft fixing section and a shaft guide section respectively assembled with the motional shafts. Each joint unit has a top portion, a first side and a second side. A rotary shaft is formed on the first side along the top portion. A socket is formed on the second side along the top portion. A (soft) display screen is disposed on the top portions of the joint units. The shaft guide section of the joint unit is defined with a first position and a second position. When a user operates and opens/closes the display screen, the rotary shafts serve as rotational fulcrums and the motional shafts are rotatably movable between the first and second positions of the shaft guide section to improve the problem of the conventional pivot pin that the pivot pin cannot be truly operated in adaptation to the flexion of the display screen.

In the above hinge device applicable to soft display screen, the joint unit assembly includes multiple joint units. The joint unit has a protrusion for assembling with a recess of an adjacent joint unit. When the joint units are rotated along with the opening/closing of the display module, the protrusion and the recess move relative to each other to establish a frictional torque system.

In the above hinge device applicable to soft display screen, the joint units include a first joint unit, a second joint unit and at least one subsidiary joint unit. Each of the first, second and subsidiary joint units is defined with two sides and two ends. Two sides of the joint units are respectively formed with rotary shafts and sockets. Two ends of the first and second joint units are respectively pivotal ends and assembling ends. A shaft guide section and a recess are disposed at or near the pivotal end of the first joint unit. A shaft fixing section and a protrusion are disposed at or near the pivotal end of the second joint unit.

In the above hinge device applicable to soft display screen, a rotary shaft and a socket are formed on the edges of two sides of the subsidiary joint unit. The rotary shafts of the forward and backward subsidiary joint units are inserted in the sockets of the adjacent subsidiary joint units, permitting the rotary shafts to freely rotate within the sockets. Protrusions, shaft fixing sections, recesses and shaft guide sections are disposed at or near two ends of the subsidiary joint units. The protrusions of the leftward and rightward subsidiary joint units are assembled with the recesses of the adjacent subsidiary joint units. Multiple motional shafts are assembled with the shaft guide section of the first joint unit, the shaft guide section or shaft fixing section of the subsidiary joint unit and the shaft fixing section of the second joint unit. When the display screen is flexed and opened/closed, under the effect of torque change, the first, second and subsidiary joint units can be rotated with the rotary shafts serving as the rotational fulcrums. At the same time, the motional shafts are rotatably moved between the first and second positions of the shaft guide section to open/close the display screen. Therefore, the total amount of motion (flexion) of the display screen is uniformly distributed to the displacement amount of every motional shaft. Therefore, the hinge device can keep every part of the soft display screen uniformly forced.

In the above hinge device applicable to soft display screen, the motional shafts are assembled with a torque mechanism. The torque mechanism includes a first torque unit, a second torque unit and at least one subsidiary torque unit respectively corresponding to the first, second and subsidiary joint units. When the motional shafts move, the torque mechanism frictionally interferes with the motional shafts to create torque change or torque difference.

The present invention can be best understood through the following description and accompanying drawings, wherein:

DETAILED DESCRIPTION OF THE PREFERRED EMBODIMENTS

Figure 1:
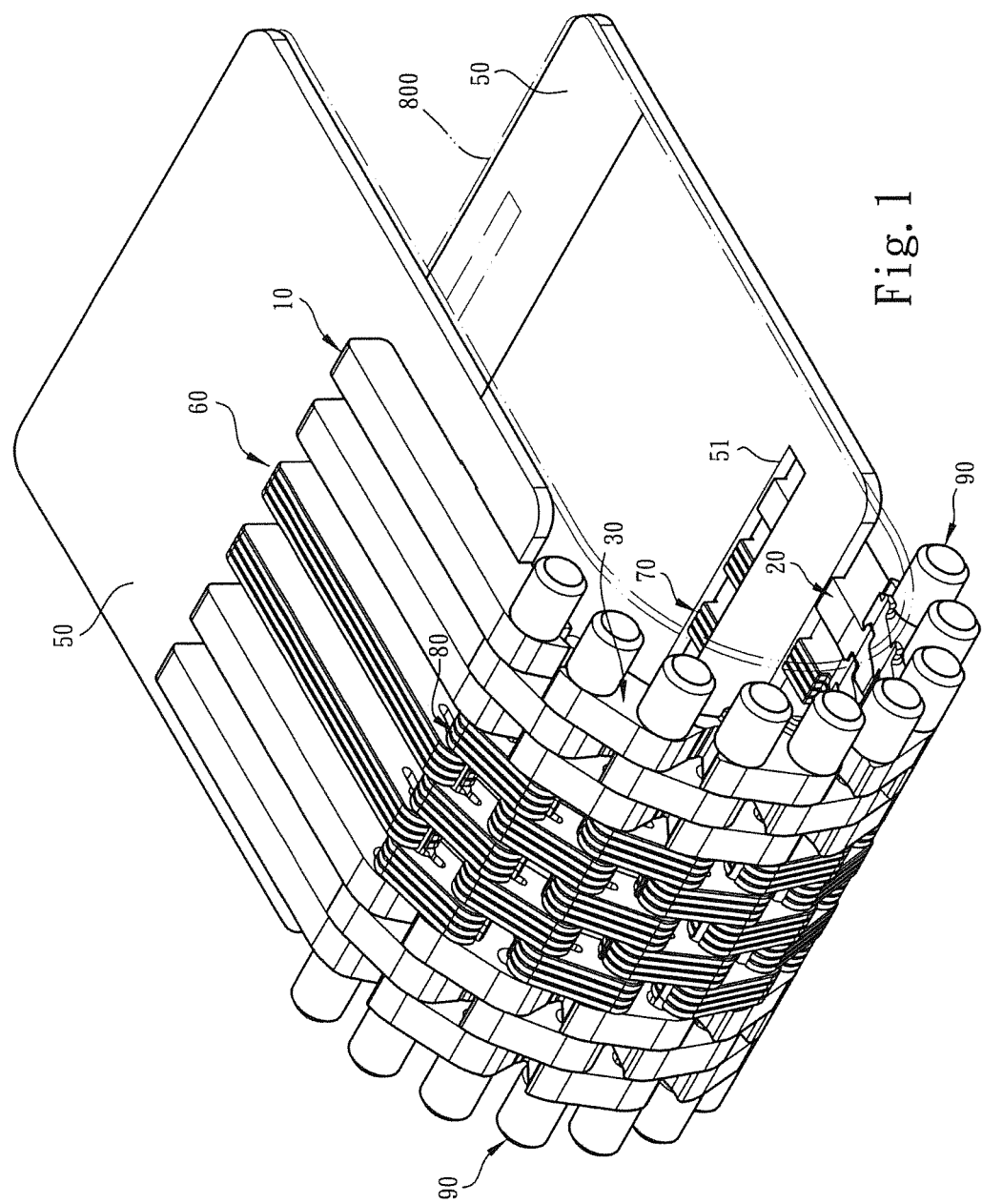
FIG. 1 is a perspective view of a preferred embodiment of the hinge device of the present invention, showing that a soft display screen is disposed on the hinge device and the soft display screen is flexed.
Figure 2:
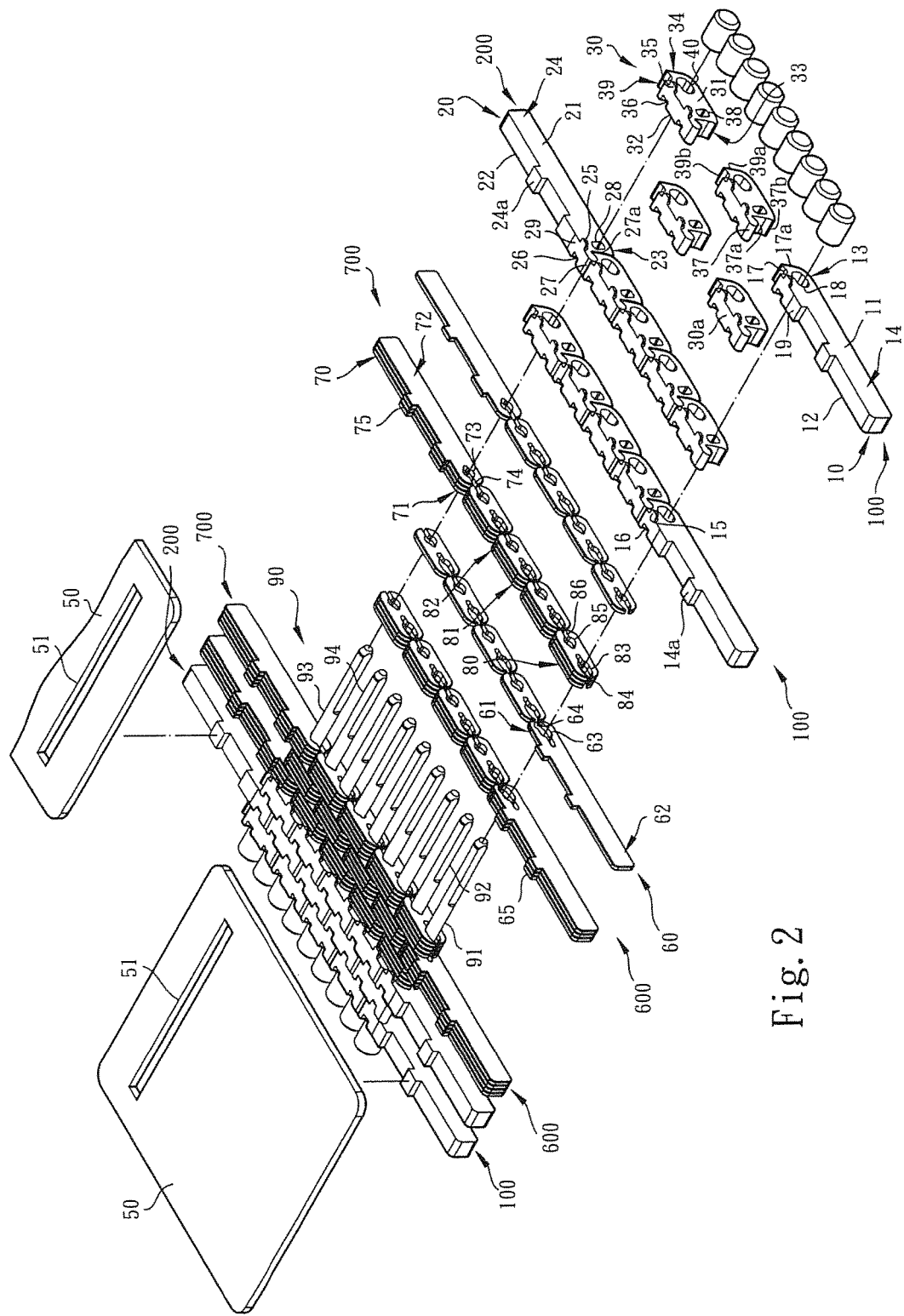
FIG. 2 is a perspective exploded view of the preferred embodiment of the hinge device of the present invention, showing the structures of the first joint unit, the subsidiary joint unit, the second joint unit and the torque mechanism of the hinge device.
Figure 3:
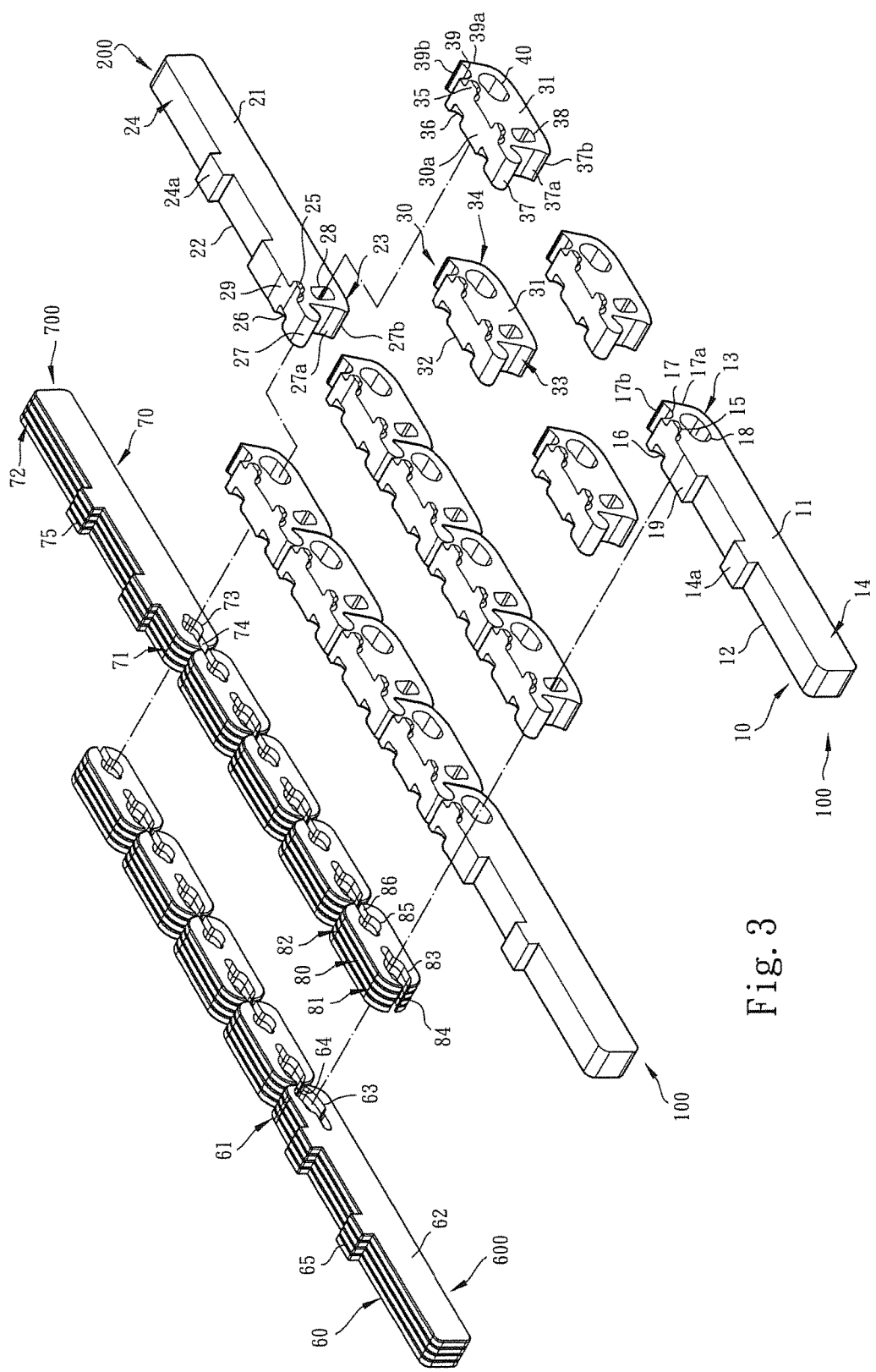
FIG. 3 is an enlarged view of a part of FIG. 2, showing the structures of the first joint unit, the subsidiary joint unit, the second joint unit and the torque mechanism of the hinge device.

Please refer to FIGS. 1, 2 and 3. The hinge device applicable to soft display screen of the present invention includes an assembly of multiple joint units 100 or 200 and motional shafts 90. As shown in the drawings, the joint units have the form of multiple adjacent plate bodies side by side combined with each other. The joint unit assembly is correspondingly assembled with multiple motional shafts 90 to form the hinge device. The hinge device can be assembled with a display screen 800 in adaptation to the opening/closing operation of the display screen 800. The display screen 800 means a common rigid display screen or a flexible soft display screen. In a preferred embodiment of the present invention, a flexible soft display screen is taken as an example hereinafter for illustration purposes.

Figure 4:
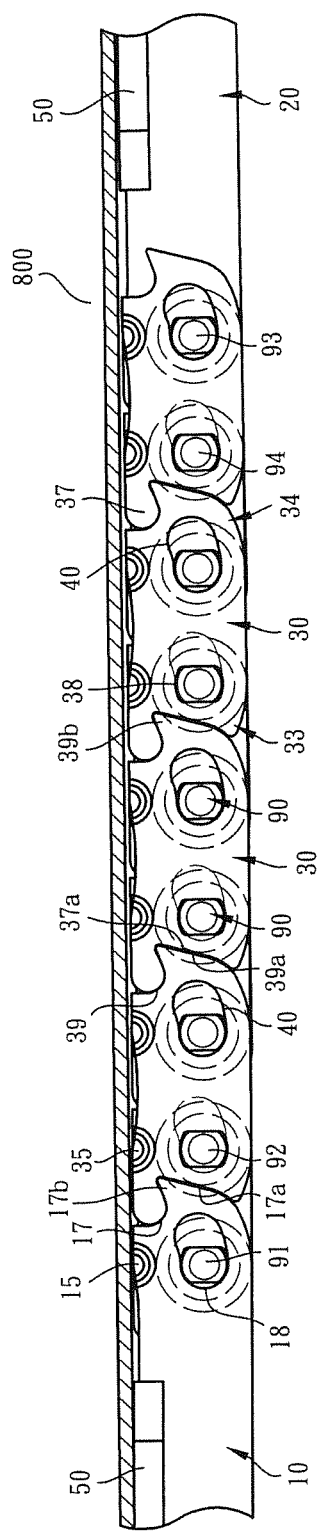
FIG. 4 is a plane view of the preferred embodiment of the hinge device of the present invention, showing that the soft display screen is disposed on the hinge device in an opened state.

As shown in FIGS. 2, 3 and 4, the joint units include a first joint unit 10, a second joint unit 20 and multiple subsidiary joint units 30. Each of the first, second and subsidiary joint units 10, 20, 30 is defined with two sides and two ends. Two sides of the first and second joint units 10, 20 are respectively first sides 11, 21 and second sides 12, 22. Two ends of the first and second joint units 10, 20 are respectively pivotal ends 13, 23 and assembling ends 14, 24. A rotary shaft 15 perpendicularly protrudes from an edge portion of top section of the first side 11 of the first joint unit 10 (near the pivotal end 13). A rotary shaft 25 perpendicularly protrudes from an edge portion of top section of the first side 21 of the second joint unit 20 (near the pivotal end 23). An edge portion of the second side 12 of the first joint unit 10 is formed with a socket 16 corresponding to the rotary shaft 15. An edge portion of the second side 22 of the second joint unit 20 is formed with a socket 26 corresponding to the rotary shaft 25.

As shown in the drawings, the pivotal end 13 of the first joint unit is formed with a recess 17, an (oblique) insertion face 17a connected with the recess 17 and a shaft guide section 18 disposed near the pivotal end 13. The shaft guide section 18 has the form of an arched slot for pivotally connecting with the motional shaft 90. Therefore, a certain (interval) distance is defined between the shaft guide section 18, the motional shaft 90 and the rotary shaft 15. The top portion 19 of the pivotal end 13 of the first joint unit is formed with a plane. The pivotal end 23 of the second joint unit is formed with a projection 27, an (oblique) insertion face 27a connected with the protrusion 27 and a shaft fixing section 28 disposed near the pivotal end 23. The shaft fixing section 28 has the form of a shaft hole for pivotally connecting with the motional shaft 90, whereby the second joint unit 20 can be moved along with the motional shaft 90. Therefore, a certain distance is defined between the shaft fixing section 28, the motional shaft 90 and the rotary shaft 25. The top portion 29 of the pivotal end 23 of the second joint unit is formed with a plane. In addition, the assembling end 14 of the first joint unit is formed with a raised connection section 14a and the assembling end 24 of the second joint unit is formed with a raised connection section 24a. The connection sections 14a, 24a are connected with a slot 51 of a fixing section 50 for arranging and assembling with the display screen 800.

In this embodiment, the subsidiary joint unit 30 is defined with a first side 31, a second side 32, a first end 33 and a second end 34. Each of the first and second ends 33, 34 of the subsidiary joint unit 30 is formed with a rotary shaft 35 perpendicularly protruding from an edge portion of top section of the first side 31 of the subsidiary joint unit 30 corresponding to the first and second joint units 10, 20. Each of the first and second ends 33, 34 of the subsidiary joint unit 30 is formed with a socket 36 on an edge portion of top section of the second side 32 of the subsidiary joint unit 30 corresponding to the rotary shaft 35.

Please refer to FIGS. 2, 3 and 4. The first end 33 of the subsidiary joint unit is formed with a projection 37, an (oblique) insertion face 37a connected with the protrusion 37 and a shaft fixing section 38 disposed near the first end 33. The shaft fixing section 38 has the form of a shaft hole for pivotally connecting with the motional shaft 90, whereby the subsidiary joint unit 30 can be moved along with the motional shaft 90. Therefore, a certain distance is defined between the shaft fixing section 38, the motional shaft 90 and the rotary shaft 35. The second end 34 of the subsidiary joint unit is formed with a recess 39, an (oblique) insertion face 39a connected with the recess 39 and a shaft guide section 40 disposed near the second end 34. The shaft guide section 40 has the form of an arched slot for pivotally connecting with the motional shaft 90. Therefore, a certain distance is defined between the shaft guide section 40, the motional shaft 90 and the rotary shaft 35. The top portion 30a of the subsidiary joint unit 30 is formed with a plane.

In this embodiment, the insertion face 17a of the first joint unit 10 and the insertion face 27a of the second joint unit 20 and the insertion face 37a of the first end 33 of the subsidiary joint unit are structurally complementary to each other. The insertion face 37a of the first end 33 of the subsidiary joint unit and the insertion face 39a of the second end 34 of the subsidiary joint unit are structurally complementary to each other. The insertion face 27a of the second joint unit 20 and the insertion face 39a of the second end 34 of the subsidiary joint unit are structurally complementary to each other.

The free ends of the insertion faces 17a, 27a, 37a, 39a are respectively formed with hook sections 17b, 27b, 37b, 39b. The hook sections 17b, 27b, 37b, 39b serve to enhance the connection stability of the insertion faces 17a, 27a, 37a, 39a and increase the slide frictional force of the insertion faces 17a, 27a, 37a, 39a.

FIGS. 2, 3 and 4 also show the structural cooperation between multiple motional shafts 90 and the joint units 100 or hinge device assembled with the motional shafts 90. When the display screen 800 is positioned in an opened position, the recess 17 and the insertion face 17a of the pivotal end 13 of the first joint unit are connected with the protrusion 37 and the insertion face 37a of the first end 33 of the subsidiary joint unit. The recess 39 and the insertion face 39a of the second end 34 of the subsidiary joint unit are connected with the protrusion 37 and the insertion face 37a of the first end 33 of another subsidiary joint unit, which is (leftward/rightward) adjacent to the subsidiary joint unit to form a first row of joint unit assembly 100. In addition, in a forward and backward side by side arrangement pattern, the protrusion 27 and the insertion face 27a of the pivotal end 23 of the second joint unit are connected with the recess 39 and the insertion face 39a of the second end 34 of the subsidiary joint unit 30. The protrusion 37 and the insertion face 37a of the first end 33 of the subsidiary joint unit are connected with the recess 39 and the insertion face 39a of the second end 34 of another subsidiary joint unit, which is (leftward/rightward) adjacent to the subsidiary joint unit to form a second row of joint unit assembly 200.

Accordingly, the shaft guide sections 18 of the pivotal ends 13 of the first joint units of the first row of joint unit assembly 100 are aligned with the shaft fixing sections 38 of the first ends 33 of the subsidiary joint units of the second row of joint unit assembly 200 and the first motional shafts 91 are pivotally connected and fitted through the shaft guide sections 18 and the shaft fixing sections 38. The shaft fixing sections 38 of the first ends 33 of the subsidiary joint units of the first row of joint unit assembly 100 are aligned with the shaft guide sections 40 of the second ends 34 of the subsidiary joint units of the second row of joint unit assembly 200 and the second motional shafts 92 are pivotally connected and fitted through the shaft fixing sections 38 and the shaft guide sections 40. In the same manner, the shaft fixing sections 28 of the pivotal ends 23 of the second joint units of the second row of joint unit assembly 200 are aligned with the shaft guide sections 40 of the second ends 34 of the (outermost) subsidiary joint units of the first row of joint unit assembly 100 and the third motional shafts 93 are pivotally connected and fitted through the shaft fixing sections 28 and the shaft guide sections 40. The shaft guide sections 40 of the second ends 34 of the subsidiary joint units of the second row of joint unit assembly 200 are aligned with the shaft fixing sections 38 of the first ends 33 of the subsidiary joint units of the first row of joint unit assembly 100 and the fourth motional shafts 94 are pivotally connected and fitted through the shaft guide sections 40 and the shaft fixing sections 38.

Also, the rotary shafts 15, 35 of the first row of joint unit assembly 100 are inserted into the sockets 26, 36 of the second row of joint unit assembly 200 to serve as rotational fulcrums (of the first row of joint unit assembly 100 and second row of joint unit assembly 200). The rotary shafts 25, 35 of the second row of joint unit assembly 200 are inserted into the sockets 16, 36 of another forward/backward adjacent first row of joint unit assembly 100 to serve as rotational fulcrums (of the first row of joint unit assembly 100 and second row of joint unit assembly 200).

When the motional shafts 90 move along with the display screen 800 or the assembling end 14 of the first joint unit and the assembling end 24 of the second joint unit, the recesses 17, 39 and the insertion faces 17a, 39a will respectively move relative to the protrusions 37, 27 and the insertion faces 37a, 27a to establish a frictional torque mechanism and achieve a locating effect immediately after the operation force disappears.

In a preferred embodiment, the motional shafts 90 are assembled with a torque mechanism. The torque mechanism includes a first torque unit 60, a second torque unit 70 and at least one subsidiary torque unit 80 respectively corresponding to the first joint unit 10, the second joint unit 20 and the subsidiary joint unit 30. When the motional shafts 90 move, the torque mechanism frictionally interferes with the motional shafts 90 to create torque change or torque difference.

To speak more specifically, the first and second torque units 60, 70 are respectively defined with pivotal ends 61, 71 and assembling ends 62, 72. Each of the assembling ends 62, 72 is formed with a raised connection section 65, 75 connected with the slot 51 of the fixing section 50. The pivotal end 61 of the first torque unit is formed with a guide hole 63 with an opening 64 corresponding to the pivotal end 13 of the first joint unit. The first motional shaft 91 is pivotally connected and fitted through the guide hole 63. The pivotal end 71 of the second torque unit is formed with a shaft hole 73 with an opening 74 corresponding to the pivotal end 23 of the second joint unit. The third motional shaft 93 is pivotally connected and fitted through the shaft hole 73. The subsidiary torque unit 80 is defined with a first end 81 and a second end 82. The first end 81 is formed with a guide hole 83 with an opening 84. The second end 82 is formed with a shaft hole 85 with an opening 86.

As shown in the drawings, the guide hole 63 and the opening 64 of the pivotal end 61 of the first torque unit face the guide hole 83 and the opening 84 of the first end 81 of the subsidiary torque unit. The shaft hole 85 and the opening 86 of the second end 82 of the subsidiary torque unit face the guide hole 83 and the opening 84 of the first end 81 of another adjacent subsidiary torque unit to form a first row of torque unit assembly 600. The shaft hole 73 and the opening 74 of the pivotal end 71 of the second torque unit face the shaft hole 85 and the opening 86 of the second end 82 of the subsidiary torque unit. The guide hole 83 and the opening 84 of the first end 81 of the subsidiary torque unit face the shaft hole 85 and the opening 86 of the second end 82 of another adjacent subsidiary torque unit to form a second row of torque unit assembly 700.

Accordingly, the guide hole 63 of the pivotal end 61 of the first torque unit is aligned with the guide hole 83 of the first end 81 of the (outermost) subsidiary torque unit of the second row of torque unit assembly 700, the shaft guide section 18 of the pivotal end 13 of the first joint unit and the shaft fixing section 38 of the first end 33 of the (outermost) subsidiary joint unit of the second row of joint unit assembly 200. The first motional shaft 91 is pivotally connected and fitted through the guide hole 63, the guide hole 83, the shaft guide section 18 and the shaft fixing section 38. The guide hole 83 of the first end 81 of the subsidiary torque unit of the first row of torque unit assembly 600 is aligned with the shaft hole 85 of the second end 82 of the (outermost) subsidiary torque unit of the second row of torque unit assembly 700, the shaft fixing section 38 of the first end 33 of the subsidiary joint unit of the first row of joint unit assembly 100 and the shaft guide section 40 of the second end 34 of the (outermost) subsidiary joint unit of the second row of joint unit assembly 200. The second motional shaft 92 is pivotally connected and fitted through the guide hole 83, the shaft hole 85, the shaft fixing section 38 and the shaft guide section 40.

Also, the shaft hole 85 of the second end 82 of the subsidiary torque unit of the (outermost) subsidiary torque unit of the first row of torque unit assembly 600 is aligned with the shaft hole 73 of the pivotal end 71 of the second torque unit, the shaft guide section 40 of the second end 34 of the subsidiary joint unit of the (outermost) subsidiary joint unit of the first row of joint unit assembly 100 and the shaft fixing section 28 of the pivotal end 23 of the second joint unit. The third motional shaft 93 is pivotally connected and fitted through the shaft hole 85, the shaft hole 73, the shaft guide section 40 and the shaft fixing section 28. The guide hole 83 of the first end 81 of the (outermost) subsidiary torque unit of the first row of torque unit assembly 600 is aligned with the shaft hole 85 of the second end 82 of the subsidiary torque unit of the second row of torque unit assembly 700, the shaft fixing section 38 of the first end 33 of the (outermost) subsidiary joint unit of the first row of joint unit assembly 100 and the shaft guide section 40 of the second end 34 of the subsidiary joint unit of the second row of joint unit assembly 200. The fourth motional shaft 94 is pivotally connected and fitted through the guide hole 83, the shaft hole 85, the shaft fixing section 38 and the shaft guide section 40.

It should be noted that the guide hole 63 and opening 64 of the pivotal end 61 of the first torque unit, the shaft hole 73 and opening 74 of the pivotal end 71 of the second torque unit, the guide hole 83 and opening 84 of the first end 81 of the subsidiary torque unit and the shaft hole 85 and opening 86 of the second end 82 of the subsidiary torque unit help in providing an elastic holding force (or torque) for the motional shaft 90 when the motional shaft 90 moves or rotates.

Please refer to FIG. 4, which shows the structural cooperation between the first joint unit 10, the second joint unit 20 and the subsidiary joint unit 30 when the display screen 800 is positioned in an opened position. When opened, the motional shaft 90 (or the first motional shaft 91) is positioned in a position in the shaft guide section 18 of the first joint unit 10, which is defined as a first position, and the motional shaft 90 (or the third motional shaft 93) is positioned in a position in the shaft guide section 40 of the subsidiary joint unit, which is also defined as a first position.

The other end of the shaft guide sections 18, 40 is defined as a second position opposite to the first position.

Figure 5:
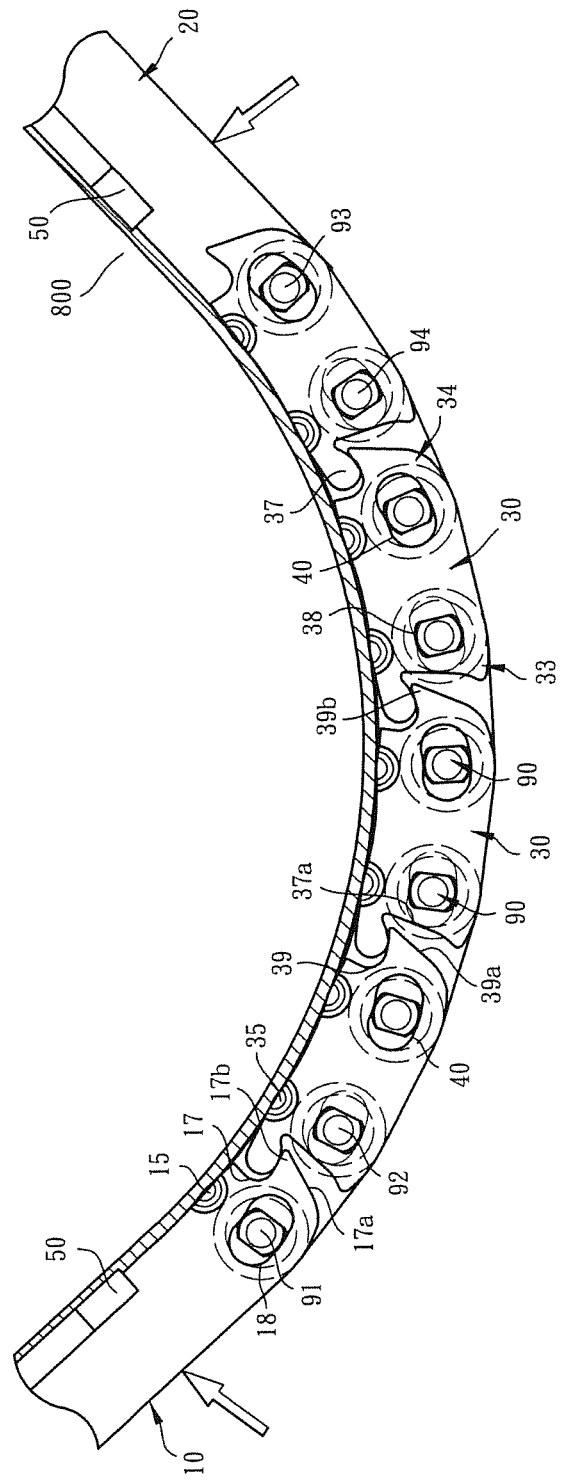
FIG. 5 is a plane view according to FIG. 4, showing that the soft display screen is flexed to a certain extent.
Figure 6:
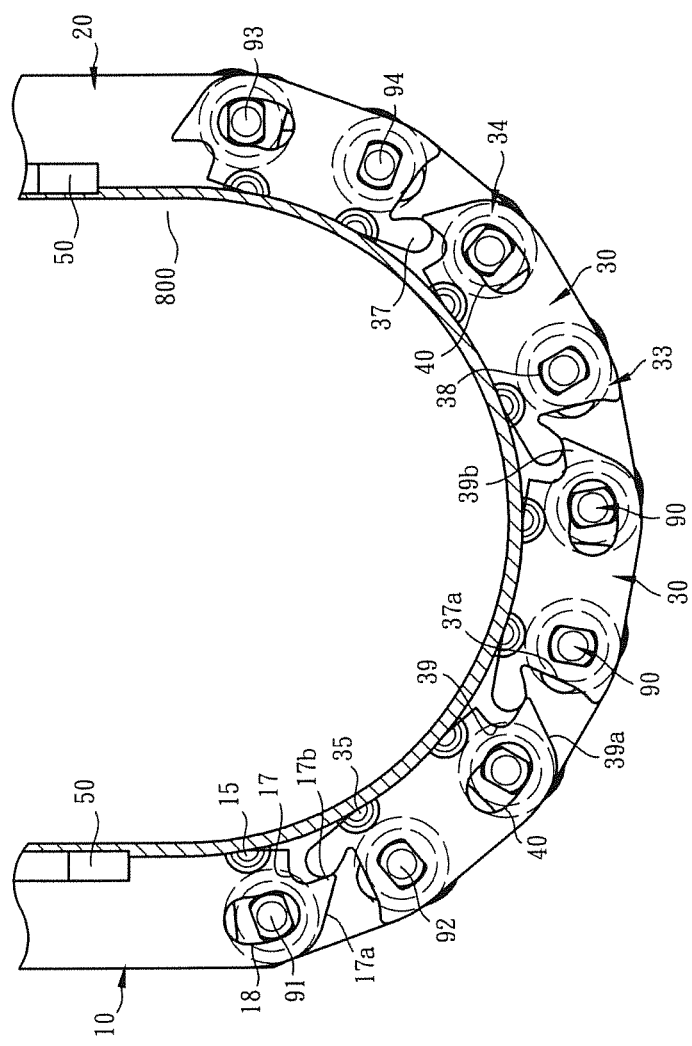
FIG. 6 is a plane view according to FIG. 5, showing that the soft display screen is fully flexed to a closed state.

When an operator operates the display screen 800 and flexes the display screen 800 from the opened position of FIG. 4 to the closed position of FIGS. 5 and 6, the fixing sections 50 drive the first joint units 10 and the second joint units 20 (and/or the first torque units 60 and the second torque units 70) to swing. At this time, the motional shafts 90 (such as the first and third motional shafts 91, 93) are forcedly rotated to drive all subsidiary joint units 30 and/or the subsidiary torque units 80 to swing. At the same time, the motional shafts 90 are moved from the first position in the shaft guide sections 18, 40 to the second position as shown in FIGS. 5 and 6.

It should be noted that the hinge device is characterized in that:

1. Each of the top portion 19 of the pivotal end 13 of the first joint unit, the top portion 29 of the pivotal end 23 of the second joint unit and the top portion 30a of the subsidiary joint unit 30 is formed with a substantially plane structure.
2. The rotary shafts 15, 25, 35 and the sockets 16, 26, 36 are formed along the planes of the top portions 19, 29, 30a. After the first and second joint units 10, 20 are assembled with the display screen 800, the display screen 800 will attach to the top portions 19, 29, 30a and is positioned in a position as adjacent to the axes (or connection line of axes) of the rotary shafts 15, 25, 35 as possible or a position coinciding with the axes.
3. When the motional shafts 90 drive the first joint unit 10, the subsidiary joint unit 30 and the second joint unit 20 to swing and rotate, the rotary shafts 15, 25, 35 of the first joint unit 10, the subsidiary joint unit 30 and the second joint unit 20 are plugged in the sockets 16, 26, 36 as the rotational fulcrums.
4. The total amount of motion of the display screen 800 is uniformly distributed to the displacement amount of every motional shaft 90. That is, the total amount of motion of the display screen 800 is distributed to the lengths of the shaft guide sections 18, 40 of every first joint unit 10 and subsidiary joint unit 30. Accordingly, the lengths of the shaft guide sections 18, 40 limit the amount of motion of every motional shaft 90. Therefore, the hinge device can ensure that the soft display screen 800 is not pressed and folded or damaged due to too large flexion angle or improper operation of a user and make every first joint unit 10, second joint unit 20 and subsidiary joint unit 30 assembled with the motional shafts 90 uniformly bear or support every part of the soft display screen 800 to keep every part of the soft display screen 800 uniformly forced. Such structure can truly improve or solve the problem that when the display screen 800 is flexed and opened/closed, the display screen 800 is squeezed and crimped as shown in FIGS. 5 and 6.

In comparison with the conventional device, the hinge device applicable to soft display screen of the present invention can be more easily operated and has the following advantages:

1. The hinge device and the relevant components have been redesigned. For example, each of the top portions 19, 29, 30a of the joint units (or the first joint unit 10, the second joint unit 20 and the subsidiary joint unit 30) is formed with a substantially plane structure. The rotary shafts 15, 25, 35 and the sockets 16, 26, 36 are formed along the planes of the top portions 19, 29, 30a. The joint units are formed with recesses 17, 39 and insertion faces 17a, 39a and/or hook sections 17b, 39b, and shaft guide sections 18, 40 for pivotally connecting with the motional shafts 90, and the protrusions 27, 37 and insertion faces 27*a*, 37*a* and/or hook sections 27*b*, 37*b*, and shaft fixing sections 28, 38 for pivotally connecting with the motional shafts 90. Accordingly, when the display screen 800 is flexed and opened/closed, the motional shafts 90 are rotatably moved between the first and second positions of the shaft guide sections 18, 40 along with the opening/closing operation of the display screen 800. This arrangement is obviously different from the conventional rotary shaft or pivot pin structure and power transmission form thereof.

2. The rotary shafts 15, 25, 35 of the joint units or the axes of the rotary shafts are as attached to the display screen 800 as possible. This changes the use form and is different from the conventional device. In practice, the application range is also widened. The hinge device is applicable to both hard and soft display screens 800 of electronic apparatuses. Moreover, the hinge device improves or solves the aforesaid problems (that the hinge device must ensure that the soft display screen is not pressed and folded or damaged and keep every part of the soft display screen uniformly forced, and when the soft display screen is flexed around the rotary shaft, the soft display screen will be squeezed and crimped).

3. The joint units are formed with the recesses 17, 39, the protrusions 27, 37, the insertion faces 17*a*, 27*a*, 37*a*, 39*a* and/or hook sections 17*b*, 27*b*, 37*b*, 39*b*. When the joint units move along with the motional shafts 90, a frictional torque system is provided. In addition, a torque mechanism (first torque units 60, second torque units 70 and subsidiary torque units 80) is further provided. The first torque units 60, second torque units 70 and subsidiary torque units 80 are formed with guide holes 63, 83 with openings 64, 84 and shaft holes 73, 85 with openings 74, 86. When the motional shafts 90 are moved or rotated, the torque mechanism exerts an elastic holding force to the motional shafts 90 to enhance the locating or fixing effect of the hinge device in operation. Moreover, according to the specification, the number or torque of the joint units and/or torque mechanisms can be easily changed or adjusted to meet the pattern design requirement of lightweight and slim configuration of electronic apparatus.

4. Especially, the total amount of motion of the display screen 800 is uniformly distributed to the displacement amount of the shaft guide sections 18, 40 of every joint unit and every motional shaft 90. Therefore, the hinge device can ensure that the soft display screen 800 is not pressed and folded or damaged due to too large flexion angle or improper operation of a user. Also, the hinge device keeps every part of the soft display screen 800 uniformly forced.

In conclusion, the hinge device applicable to soft display screen of the present invention is different from the conventional device in space form and is advantageous over the conventional device. The hinge device of the present invention is inventive and patentable.

The above embodiments are only used to illustrate the present invention, not intended to limit the scope thereof. Many modifications of the above embodiments can be made without departing from the spirit of the present invention.

What is claimed is:

1. A hinge device applicable to soft display screen, comprising an assembly of multiple joint units and multiple motional shafts, each joint unit having a shaft guide section and a shaft fixing section respectively assembled with the motional shafts, each joint unit having a top portion, a first side and a second side, a rotary shaft and a corresponding socket being formed on the first and second sides of the joint unit along the top portion, the shaft guide section of the joint unit being defined with a first position and a second position, the hinge device being rotatable with the rotary shaft and the socket serving as rotational fulcrums, whereby the motional shafts are rotatably movable between the first and second positions of the shaft guide section, a total amount of motion of the hinge device being uniformly distributed to a displacement amount of every said motional shaft.

2. The hinge device applicable to soft display screen as claimed in claim 1, wherein a display screen is disposed on the top portion of the joint unit;
wherein the shaft guide section is an arched slot structure, while the shaft fixing section is a shaft hole structure.

3. The hinge device applicable to soft display screen as claimed in claim 2, wherein a distance is defined between the rotary shaft, the motional shaft of the shaft guide section and the motional shaft of the shaft fixing section, the joint units including a first joint unit, a second joint unit and at least one subsidiary joint unit, each of the first and second joint units having a pivotal end and an assembling end, the pivotal end of the first joint unit being formed with a recess and an insertion face connected with the recess, the shaft guide section being disposed at the pivotal end of the first joint unit, the pivotal end of the second joint unit being formed with a protrusion and an insertion face connected with the protrusion, the shaft fixing section being disposed at the pivotal end of the second joint unit, the subsidiary joint unit having a top portion, a first side, a second side, a first end and a second end, the first side of the subsidiary joint unit being formed with the rotary shaft along the top portion, the second side of the subsidiary joint unit being formed with the socket along the top portion, the first end of the subsidiary joint unit being formed with a protrusion and an insertion face connected with the protrusion, the shaft fixing section being disposed at the first end of the subsidiary joint unit for pivotally connecting with the motional shaft, the second end of the subsidiary joint unit being formed with a recess and an insertion face connected with the recess, the shaft guide section being disposed at the second end of the subsidiary joint unit for pivotally connecting with the motional shaft, a distance being defined between the rotary shaft of the subsidiary joint unit, the motional shaft of the shaft guide section of the subsidiary joint unit and the motional shaft of the shaft fixing section of the subsidiary joint unit.

4. The hinge device applicable to soft display screen as claimed in claim 3, wherein the rotary shafts respectively perpendicularly protrude from the first sides of the first, second and subsidiary joint units along the top portions thereof, the top portions of the first, second and subsidiary joint units being plane structures.

5. The hinge device applicable to soft display screen as claimed in claim 4, wherein the motional shafts are assembled with a torque mechanism, the torque mechanism including a first torque unit, a second torque unit and a subsidiary torque unit respectively corresponding to the first, second and subsidiary joint units, the first and second torque units being respectively defined with pivotal ends and assembling ends, the pivotal end of the first torque unit being formed with a guide hole with an opening corresponding to the pivotal end of the first joint unit, the pivotal end of the second torque unit being formed with a shaft hole with an opening corresponding to the pivotal end of the second joint unit, the subsidiary torque unit having a first end and a second end, the first end being formed with a guide hole with an opening, the second end being formed with a shaft hole with an opening, the motional shafts being respectively pivotally connected with the guide holes and shaft holes of the torque mechanism, whereby when the motional shafts move, the torque mechanism interferes with the motional shafts to create torque change.

6. The hinge device applicable to soft display screen as claimed in claim 5, wherein each of the assembling ends of the first and second torque units is formed with a raised connection section connected with the slot of the fixing section.

7. The hinge device applicable to soft display screen as claimed in claim 3, the insertion face of the first joint unit and the insertion face of the second joint unit and the insertion face of the first end of the subsidiary joint unit are structurally obliquely complementary to each other, the insertion face of the first end of the subsidiary joint unit and the insertion face of the second end of the subsidiary joint unit being structurally complementary to each other, the insertion face of the second joint unit and the insertion face of the second end of the subsidiary joint unit being structurally obliquely complementary to each other, a free end of each of the insertion face of the first joint unit, the insertion face of the second joint unit being and the insertion faces of the subsidiary joint unit being formed with a hook section.

8. The hinge device applicable to soft display screen as claimed in claim 7, wherein the recess and the insertion face of the pivotal end of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

9. The hinge device applicable to soft display screen as claimed in claim 8, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft.

10. The hinge device applicable to soft display screen as claimed in claim 9, wherein each of the assembling ends of the first and second torque units is formed with a raised connection section connected with the slot of the fixing section.

11. The hinge device applicable to soft display screen as claimed in claim 3, wherein the recess and the insertion face of the pivotal end of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

12. The hinge device applicable to soft display screen as claimed in claim 11, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft.

13. The hinge device applicable to soft display screen as claimed in claim 12, wherein each of the assembling ends of the first and second torque units is formed with a raised connection section connected with the slot of the fixing section.

14. The hinge device applicable to soft display screen as claimed in claim 3, wherein the motional shafts are assembled with a torque mechanism, the torque mechanism including a first torque unit, a second torque unit and a subsidiary torque unit respectively corresponding to the first, second and subsidiary joint units, the first and second torque units being respectively defined with pivotal ends and assembling ends, the pivotal end of the first torque unit being formed with a guide hole with an opening corresponding to the pivotal end of the first joint unit, the pivotal end of the second torque unit being formed with a shaft hole with an opening corresponding to the pivotal end of the second joint unit, the subsidiary torque unit having a first end and a second end, the first end being formed with a guide hole with an opening, the second end being formed with a shaft hole with an opening, the motional shafts being respectively pivotally connected with the guide holes and shaft holes of the torque mechanism, whereby when the motional shafts move, the torque mechanism interferes with the motional shafts to create torque change.

15. The hinge device applicable to soft display screen as claimed in claim 14, wherein each of the assembling ends of the first and second torque units is formed with a raised connection section connected with the slot of the fixing section.

16. The hinge device applicable to soft display screen as claimed in claim 1, wherein a distance is defined between the rotary shaft, the motional shaft of the shaft guide section and the motional shaft of the shaft fixing section, the joint units including a first joint unit, a second joint unit and at least one subsidiary joint unit, each of the first and second joint units having a pivotal end and an assembling end, the pivotal end of the first joint unit being formed with a recess and an insertion face connected with the recess, the shaft guide section being disposed at the pivotal end of the first joint unit, the pivotal end of the second joint unit being formed with a protrusion and an insertion face connected with the protrusion, the shaft fixing section being disposed at the pivotal end of the second joint unit, the subsidiary joint unit having a top portion, a first side, a second side, a first end and a second end, the first side of the subsidiary joint unit being formed with the rotary shaft along the top portion, the second side of the subsidiary joint unit being formed with the socket along the top portion, the first end of the subsidiary joint unit being formed with a protrusion and an insertion face connected with the protrusion, the shaft fixing section being disposed at the first end of the subsidiary joint unit for pivotally connecting with the motional shaft, the second end of the subsidiary joint unit being formed with a recess and an insertion face connected with the recess, the shaft guide section being disposed at the second end of the subsidiary joint unit for pivotally connecting with the motional shaft, a distance being defined between the rotary shaft of the subsidiary joint unit, the motional shaft of the shaft guide section of the subsidiary joint unit and the motional shaft of the shaft fixing section of the subsidiary joint unit.

17. The hinge device applicable to soft display screen as claimed in claim 16, wherein the rotary shafts respectively perpendicularly protrude from the first sides of the first, second and subsidiary joint units along the top portions thereof, the top portions of the first, second and subsidiary joint units being plane structures.

18. The hinge device applicable to soft display screen as claimed in claim 17, the insertion face of the first joint unit and the insertion face of the second joint unit and the insertion face of the first end of the subsidiary joint unit are structurally obliquely complementary to each other, the insertion face of the first end of the subsidiary joint unit and the insertion face of the second end of the subsidiary joint unit being structurally complementary to each other, the insertion face of the second joint unit and the insertion face of the second end of the subsidiary joint unit being structurally obliquely complementary to each other, a free end of each of the insertion face of the first joint unit, the insertion face of the second joint unit being and the insertion faces of the subsidiary joint unit being formed with a hook section.

19. The hinge device applicable to soft display screen as claimed in claim 18, wherein the recess and the insertion face of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

20. The hinge device applicable to soft display screen as claimed in claim 19, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft.

21. The hinge device applicable to soft display screen as claimed in claim 20, wherein each of the assembling ends of the first and second torque units is formed with a raised connection section connected with the slot of the fixing section.

22. The hinge device applicable to soft display screen as claimed in claim 18, wherein the motional shafts are assembled with a torque mechanism, the torque mechanism including a first torque unit, a second torque unit and a subsidiary torque unit respectively corresponding to the first, second and subsidiary joint units, the first and second torque units being respectively defined with pivotal ends and assembling ends, the pivotal end of the first torque unit being formed with a guide hole with an opening corresponding to the pivotal end of the first joint unit, the pivotal end of the second torque unit being formed with a shaft hole with an opening corresponding to the pivotal end of the second joint unit, the subsidiary torque unit having a first end and a second end, the first end being formed with a guide hole with an opening, the second end being formed with a shaft hole with an opening, the motional shafts being respectively pivotally connected with the guide holes and shaft holes of the torque mechanism, whereby when the motional shafts move, the torque mechanism interferes with the motional shafts to create torque change.

23. The hinge device applicable to soft display screen as claimed in claim 22, wherein each of the assembling ends of the first and second torque units is formed with a raised connection section connected with the slot of the fixing section.

24. The hinge device applicable to soft display screen as claimed in claim 17, wherein the recess and the insertion face of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

25. The hinge device applicable to soft display screen as claimed in claim 24, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft.

26. The hinge device applicable to soft display screen as claimed in claim 25, wherein each of the assembling ends of the first and second torque units is formed with a raised connection section connected with the slot of the fixing section.

27. The hinge device applicable to soft display screen as claimed in claim 17, wherein the motional shafts are assembled with a torque mechanism, the torque mechanism including a first torque unit, a second torque unit and a subsidiary torque unit respectively corresponding to the first, second and subsidiary joint units, the first and second torque units being respectively defined with pivotal ends and assembling ends, the pivotal end of the first torque unit being formed with a guide hole with an opening corresponding to the pivotal end of the first joint unit, the pivotal end of the second torque unit being formed with a shaft hole with an opening corresponding to the pivotal end of the second joint unit, the subsidiary torque unit having a first end and a second end, the first end being formed with a guide hole with an opening, the second end being formed with a shaft hole with an opening, the motional shafts being respectively pivotally connected with the guide holes and shaft holes of the torque mechanism, whereby when the motional shafts move, the torque mechanism interferes with the motional shafts to create torque change.

28. The hinge device applicable to soft display screen as claimed in claim 27, wherein each of the assembling ends of the first and second torque units is formed with a raised connection section connected with the slot of the fixing section.

29. The hinge device applicable to soft display screen as claimed in claim 16, the insertion face of the first joint unit and the insertion face of the second joint unit and the insertion face of the first end of the subsidiary joint unit are structurally obliquely complementary to each other, the insertion face of the first end of the subsidiary joint unit and the insertion face of the second end of the subsidiary joint unit being structurally complementary to each other, the insertion face of the second joint unit and the insertion face of the second end of the subsidiary joint unit being structurally obliquely complementary to each other, a free end of each of the insertion face of the first joint unit, the insertion face of the second joint unit being and the insertion faces of the subsidiary joint unit being formed with a hook section.

30. The hinge device applicable to soft display screen as claimed in claim 29, wherein the recess and the insertion face of the pivotal end of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

31. The hinge device applicable to soft display screen as claimed in claim 30, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft.

32. The hinge device applicable to soft display screen as claimed in claim 31, wherein each of the assembling ends of the first and second torque units is formed with a raised connection section connected with the slot of the fixing section.

33. The hinge device applicable to soft display screen as claimed in claim 16, wherein the recess and the insertion face of the pivotal end of the first joint unit are connected with the protrusion and the insertion face of the first end of the subsidiary joint unit, the recess and the insertion face of the second end of the subsidiary joint unit being connected with the protrusion and the insertion face of the first end of another leftward/rightward adjacent subsidiary joint unit to form a first row of joint unit assembly, in a forward and backward side by side arrangement pattern, the protrusion and the insertion face of the pivotal end of the second joint unit being connected with the recess and the insertion face of the second end of the subsidiary joint unit, the protrusion and the insertion face of the first end of the subsidiary joint unit being connected with the recess and the insertion face of the second end of another leftward/rightward adjacent subsidiary joint unit to form a second row of joint unit assembly, the shaft guide sections of the pivotal end of the first joint unit of the first row of joint unit assembly being aligned with the shaft fixing section of the first end of the subsidiary joint unit of the second row of joint unit assembly, the first motional shaft being pivotally connected with the shaft guide section and the shaft fixing section, the shaft fixing section of the first end of the subsidiary joint unit of the first row of joint unit assembly being aligned with the shaft guide section of the second end of the subsidiary joint unit of the second row of joint unit assembly, the second motional shaft being pivotally connected with the shaft fixing section and the shaft guide section, in the same one by one arrangement manner, the shaft fixing section of the pivotal end of the second joint unit of the second row of joint unit assembly being aligned with the shaft guide section of the second end of the outermost subsidiary joint unit of the first row of joint unit assembly, the third motional shaft being pivotally connected with the shaft fixing section and the shaft guide section, the shaft guide section of the second end of the subsidiary joint unit of the second row of joint unit assembly being aligned with the shaft fixing section of the first end of the subsidiary joint units of the first row of joint unit assembly, the fourth motional shaft being pivotally connected with the shaft guide section and the shaft fixing section, the rotary shaft of the first row of joint unit assembly being inserted into the socket of the second row of joint unit assembly to serve as a rotational fulcrum of the first row of joint unit assembly and the second row of joint unit assembly, the rotary shaft of the second row of joint unit assembly being inserted into the socket of another forward/backward adjacent first row of joint unit assembly to serve as a rotational fulcrum of the first row of joint unit assembly and the second row of joint unit assembly, the assembling end of the first joint unit being formed with a raised connection section and the assembling end of the second joint unit being formed with a raised connection section, the connection sections being assembled with a slot of a fixing section.

34. The hinge device applicable to soft display screen as claimed in claim 33, wherein the motional shafts are assembled with a torque mechanism, the torque mechanism including a first torque unit, a second torque unit and at least one subsidiary torque unit, the first and second torque units being respectively defined with pivotal ends and assembling ends, the pivotal end of the first torque unit being formed with a guide hole with an opening corresponding to the pivotal end of the first joint unit for pivotally connecting with the first motional shaft, the pivotal end of the second torque unit being formed with a shaft hole with an opening corresponding to the pivotal end of the second joint unit for pivotally connecting with the third motional shaft, the subsidiary torque unit having a first end and a second end, the first end being formed with a guide hole with an opening, the second end being formed with a shaft hole with an opening, the guide hole and the opening of the pivotal end of the first torque unit facing the guide hole and the opening of the first end of the subsidiary torque unit, the shaft hole and the opening of the second end of the subsidiary torque unit facing the guide hole and the opening of the first end of another adjacent subsidiary torque unit to form a first row of torque unit assembly, the guide hole and the opening of the pivotal end of the second torque unit facing the shaft hole and the opening of the second end of the subsidiary torque unit, the guide hole and the opening of the first end of the subsidiary torque unit facing the shaft hole and the opening of the second end of another adjacent subsidiary torque unit to form a second row of torque unit assembly, the guide hole of the pivotal end of the first torque unit being aligned with the guide hole of the first end of the outermost subsidiary torque unit of the second row of torque unit assembly, the shaft guide section of the pivotal end of the first joint unit and the shaft fixing section of the first end of the outermost subsidiary joint unit of the second row of joint unit assembly for pivotally connecting with the first motional shaft, the guide hole of the first end of the subsidiary torque unit of the first row of torque unit assembly being aligned with the shaft hole of the second end of the outermost subsidiary torque unit of the second row of torque unit assembly, the shaft fixing section of the first end of the subsidiary joint unit of the first row of joint unit assembly and the shaft guide section of the second end of the outermost subsidiary joint unit of the second row of joint unit assembly for pivotally connecting with the second motional shaft, the shaft hole of the second end of the subsidiary torque unit of the outermost subsidiary torque unit of the first row of torque unit assembly being aligned with the shaft hole of the pivotal end of the second torque unit, the shaft guide section of the second end of the subsidiary joint unit of the outermost subsidiary joint unit of the first row of joint unit assembly and the shaft fixing section of the pivotal end of the second joint unit for pivotally connecting with the third motional shaft, the guide hole of the first end of the outermost subsidiary torque unit of the first row of torque unit assembly being aligned with the shaft hole of the second end of the subsidiary torque unit of the second row of torque unit assembly, the shaft fixing section of the first end of the outermost subsidiary joint unit of the first row of joint unit assembly and the shaft guide section of the second end of the subsidiary joint unit of the second row of joint unit assembly for pivotally connecting with the fourth motional shaft.

35. The hinge device applicable to soft display screen as claimed in claim 34, wherein each of the assembling ends of the first and second torque units is formed with a raised connection section connected with the slot of the fixing section.

36. The hinge device applicable to soft display screen as claimed in claim 16, wherein the motional shafts are assembled with a torque mechanism, the torque mechanism including a first torque unit, a second torque unit and a subsidiary torque unit respectively corresponding to the first, second and subsidiary joint units, the first and second torque units being respectively defined with pivotal ends and assembling ends, the pivotal end of the first torque unit being formed with a guide hole with an opening corresponding to the pivotal end of the first joint unit, the pivotal end of the second torque unit being formed with a shaft hole with an opening corresponding to the pivotal end of the second joint unit, the subsidiary torque unit having a first end and a second end, the first end being formed with a guide hole with an opening, the second end being formed with a shaft hole with an opening, the motional shafts being respectively pivotally connected with the guide holes and shaft holes of the torque mechanism, whereby when the motional shafts move, the torque mechanism interferes with the motional shafts to create torque change.

37. The hinge device applicable to soft display screen as claimed in claim 36, wherein each of the assembling ends of the first and second torque units is formed with a raised connection section connected with the slot of the fixing section.

38. The hinge device applicable to soft display screen as claimed in claim 1, wherein the rotary shaft perpendicularly protrudes from the first side of the joint unit along the top portion, the top portion of the joint unit being a plane structure.

39. The hinge device applicable to soft display screen as claimed in claim 38, wherein the motional shafts are assembled with a torque mechanism, the torque mechanism being formed with a guide hole with an opening and a shaft hole with an opening, the guide hole and shaft hole of the torque mechanism being pivotally connected with the motional shafts, whereby when the motional shafts move, the torque mechanism interferes with the motional shafts to create torque change.

40. The hinge device applicable to soft display screen as claimed in claim 1, wherein the motional shafts are assembled with a torque mechanism, the torque mechanism being formed with a guide hole with an opening and a shaft hole with an opening, the guide hole and shaft hole of the torque mechanism being pivotally connected with the motional shafts, whereby when the motional shafts move, the torque mechanism interferes with the motional shafts to create torque change.

\* \* \* \* \*